May 26, 1953  G. L. N. MEYER  2,639,849
PROCESSING CONTAINER FOR CARBONATED BEVERAGES
Filed March 30, 1949
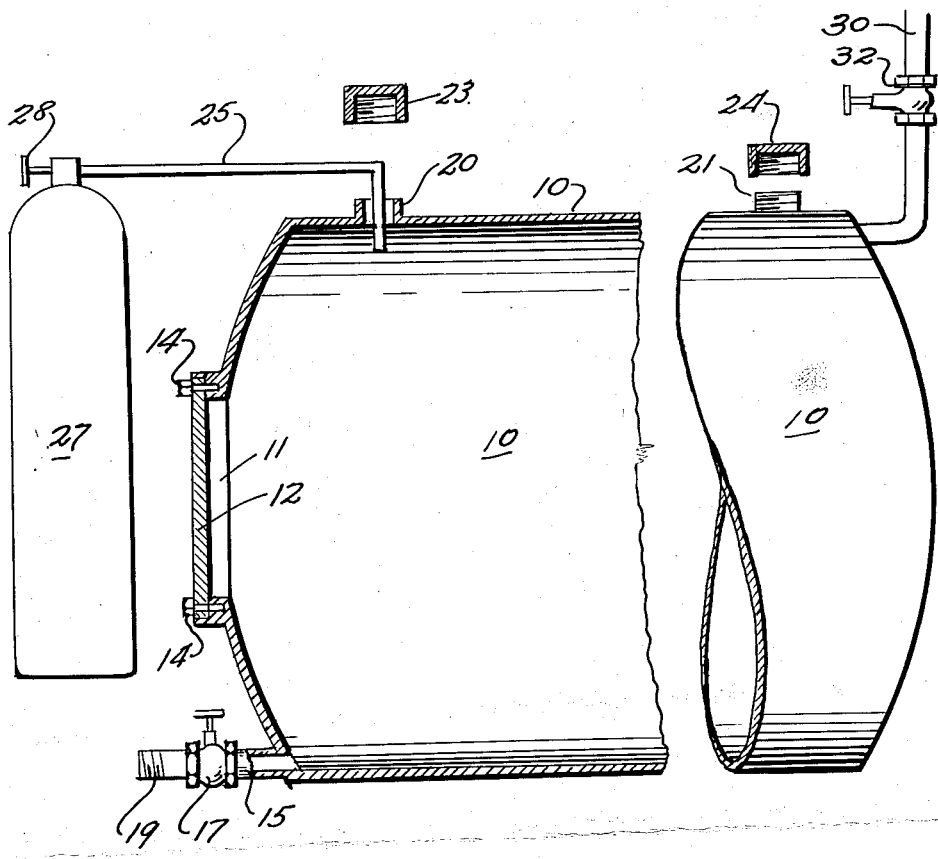
INVENTOR.
Geo. L. N. Meyer
BY
Eugene W. Simpson.
His Attorney.

Patented May 26, 1953

2,639,849

UNITED STATES PATENT OFFICE 2,639,849

PROCESSING CONTAINER FOR CARBONATED BEVERAGES

George L. N. Meyer, Milwaukee, Wis., assignor to Geo. J. Meyer Manufacturing Company, Cudahy, Wis., a corporation of Wisconsin Application March 30, 1949, Serial No. 84,332

3 Claims. (Cl. 226—20.2)

This invention relates to processing of containers prior to filling the same with beverages containing $CO_2$ gas.

When carbonated beverages such as carbonated water, "pop" or beer are sold in containers the aroma and taste of the beverage deteriorates when in contact with free air, the amount of deterioration varying with the length of time the beverage has been in contact with the air. It is therefore desirable to keep the beverage out of contact with air as much as possible during the time it is in the storage tank and in the filler bowl.

In storing beer it has been common practice to fill a storage tank with the beer, the space above the beer being filled with air. The gas pressure above the beer is then increased by the introduction of $CO_2$ under pressure and the pressure is maintained by the continued supply of the $CO_2$ under pressure. This system has been followed with few attempts, if any, to eliminate the air present during filling of the tank.

When the tank is emptied and cleaned all the $CO_2$ is blown out to enable workers to clean the tank and the beer again pumped into the tank in contact with the air head.

In bottling or canning the beer or other carbonic gas drinks, the air in the bottle or the can passes into the top of the filler bowl during the filling of the container, thus contaminating the $CO_2$ in the top of the filler bowl.

It is an object of the present invention to provide a method of conditioning containers which will reduce the time of contact of carbonated beverages with air.

Another object is to provide a method of storing carbonated beverages which will reduce the amount of free air in contact with the beverage.

Another object is to provide a method of conditioning containers which will prevent the $CO_2$ in the filler bowl of a container filling machine from becoming contaminated with air.

A further object is to provide a method of conditioning containers which will preserve the taste and aroma of carbonated beverages.

A still further object of the invention is to provide a method of conditioning a beer storage tank to reduce the amount of free air above the beer.

Other objects will become apparent upon considering the following specification, which, when taken in conjunction with the accompanying drawing illustrates a preferred form of the invention.

In the drawing:

The single figure is a view, partly in cross-section through a typical beer storage tank, and illustrates the principles of the invention.

Referring to the drawing the beer storage tank 10 is usually cylindrical in shape and lies on its side where it is supported either in cradles or other footings (not shown). The tank 10 may be provided with a manhole 11 in one end, through which a man may enter to clean the tank. A manhole cover 12 may be secured over the manhole 11 by bolts 14, or other suitable means.

Liquid in the tank is drawn off by means of a pipe 15 mounted at the low point of the tank, the tank being inclined slightly toward the outlet pipe 15. A valve 17 is provided in the outlet pipe 15 to control the flow of liquid therethrough.

In practice a hose is coupled on the threaded end 19 of the pipe 15 and joins the pipe 15 to a pipe leading to the bottle filling machine (not shown). When the tank is emptied and about to be cleaned, the hose is uncoupled from the pipe 15 and the cleaning liquids allowed to drain into a sewer.

The upper side of the tank 10 is provided with a pair of apertures 20—21 which serve either to admit air to the tank or allow air to escape from the tank. Caps 23—24 are provided to close the openings and prevent the passage of fluids therethrough.

To clean the tank 10 the beverage is drained out until but a small amount is left in the tank. The $CO_2$ pressure in the tank 10 is then reduced to atmospheric and the vents 20 and 21 opened by removing the caps 23—24. If desired a hose (not shown) may be used to connect one of the vents 20—21 with the area outside the building.

Air under pressure is introduced in one of the openings 20—21 to force the $CO_2$ gas in the tank out the other opening and out of the building. When the $CO_2$ gas is completely expelled from the tank 10, the manhole 11 may be uncovered and the workmen admitted to clean and scrub the interior of the tank.

When the tank is clean and drained, the manhole cover 12 is replaced on the hole and secured thereon by the bolts 14. The tank is then ready for refilling in accordance with the present invention.

According to the present invention a pipe 25 leading from a flask 27 of liquefied carbonic gas is directed into the tank 10 through one of the vent openings 20 or 21 and a valve 28 on the flask opened to permit the liquefied carbonic gas to flow through the pipe and into the tank 10.

As the liquefied gas leaves the open end of the pipe 25 it evaporates to a gas, thus cooling the liquid to solid $CO_2$ snow which is deposited in the bottom of the tank. The rush of $CO_2$ gas through the pipe 25 and into the tank 10 forces a considerable proportion of the air together with some of the $CO_2$ gas out the opening 21 to atmosphere.

As the $CO_2$ snow in the bottom of the tank 10 evaporates it forms stratas of cold $CO_2$ gas, which force the remaining air in tank 10 to pass out through the openings 20 and/or 21.

When the air is eliminated from the tank 10, the caps 23—24 may be replaced on the openings 20—21 and beer pumped into the tank through the pipe 15. When the tank 10 is filled with beer to the desired level, additional $CO_2$ gas may be introduced through a supply pipe 30 by opening a valve 32 to supply the pressure necessary to raise the beverage to the filling machines.

It is equally advantageous to eliminate the air from bottles and cans prior to filling with carbonated beverages in order to prevent contamination of the $CO_2$ gas in the filler bowl with air from the bottle.

To accomplish this object, according to the present invention, $CO_2$ gas is shot into the container together with a quantity of $CO_2$ snow just prior to the container reaching the filling machine. The $CO_2$ gas being under pressure forces a large percentage of the air from the container and the evaporating $CO_2$ snow forms a strata which forces the remaining air out of the container thus leaving only $CO_2$ gas in the container when the container is lifted into filling position on the filling machine. Since there is only $CO_2$ gas in the container during filling, the $CO_2$ gas in the filler bowl is not diluted and the fine flavor and taste of the beverage is preserved.

It is obvious that the herein disclosed method provides containers filled with $CO_2$ gas prior to the entrance of the carbonated beverage thereto thus preserving both the flavor and taste of the beverage.

It is likewise obvious that the herein disclosed method is of broad application and is not only applicable to carbonated beverages but applies wherever it is advantageous to maintain a head of pure $CO_2$ above a liquid. Various modifications of the method herein disclosed are contemplated which are intended to be covered by the scope of the appended claims.

That which is claimed as new and is desired to be secured by United States Letters Patent is:

1. The method of conditioning a container with $CO_2$ gas which comprises the following steps: directing liquefied carbonic gas into an open container to permit the liquid to expand to a gas and freeze subsequent liquid to $CO_2$ snow, continuing the deposit of a quantity of $CO_2$ snow on the bottom of the container, allowing the snow to evaporate into $CO_2$ gas and to force air from the container, and sealing the container after the air has been forced therefrom.

2. The method of filling a storage tank with a beverage containing $CO_2$ gas, which method comprises, projecting $CO_2$ gas and $CO_2$ snow into the tank to force air out a vent opening, permitting the snow to evaporate to force out the remaining air, sealing the tank and filling the tank with the beverage.

3. The method of conditioning a container with $CO_2$ gas which comprises the following steps: directing liquefied carbonic gas into an open container to permit the liquid to expand to a gas and freeze subsequent liquid to $CO_2$ snow, continuing the deposit of a quantity of $CO_2$ snow on the bottom of the container, allowing the snow to evaporate into $CO_2$ gas and to force air from the container, closing the container after the air has been forced therefrom, and filling the container with a carbonated beverage.

GEORGE L. N. MEYER.

References Cited in the file of this patent

UNITED STATES PATENTS

| Number | Name | Date |
|---|---|---|
| 1,825,645 | Martin | Sept. 29, 1931 |
| 1,897,939 | Martin | Feb. 14, 1933 |
| 2,092,174 | Lithgow | Sept. 7, 1937 |
| 2,294,172 | Getz | Aug. 25, 1942 |
| 2,342,221 | Quinn | Feb. 22, 1944 |

FOREIGN PATENTS

| Number | Country | Date |
|---|---|---|
| 16,619 | Australia | 1934 |